United States Patent [19]

Menell

[11] 4,315,788

[45] Feb. 16, 1982

[54] METHOD OF PRODUCING ENDLESS DRIVE BELTS

[75] Inventor: Hans Menell, Hanover, Fed. Rep. of Germany

[73] Assignee: Continental Gummi-Werke Aktiengesellschaft, Hanover, Fed. Rep. of Germany

[21] Appl. No.: 102,385

[22] Filed: Dec. 11, 1979

[30] Foreign Application Priority Data

Dec. 22, 1978 [DE] Fed. Rep. of Germany ....... 2856622

[51] Int. Cl.$^3$ .......................... B29H 7/22; F16G 1/28
[52] U.S. Cl. ....................................... 156/85; 156/137; 156/138; 156/139; 156/140; 474/251; 474/263
[58] Field of Search .................... 156/84, 85, 86, 137, 156/138, 139, 140, 141; 74/231 R, 232, 233, 234; 264/230, 342 R

[56] References Cited

U.S. PATENT DOCUMENTS

| | | | |
|---|---|---|---|
| 2,139,840 | 12/1938 | McKone | 156/84 |
| 2,573,642 | 10/1951 | Hurry | 156/139 |
| 3,078,205 | 2/1963 | Sauer et al. | 156/137 |
| 3,090,716 | 5/1963 | Stevens | 74/233 |
| 3,930,418 | 1/1976 | Dutton | 156/139 |

*Primary Examiner*—Caleb Weston

*Attorney, Agent, or Firm*—Becker & Becker, Inc.

[57] ABSTRACT

A method of producing endless drive belts of natural or synthetic rubber with thread-shaped embedded strength carriers which preferably extend in the longitudinal direction. This method relates especially to multiple V-belts and similar belts having longitudinal ribs extending continuously over the inner periphery or circumference thereof. A raw belt member is built up in upside-down sequence of layering, and is placed into an outer form or mold, in which it is formed-out and vulcanized. The belts are then turned or folded or rolled over into the use condition thereof. The raw belt member, which is produced oversize with respect to the outer form or mold, is retracted, pulled-in, or drawn-in to an outer diameter corresponding to the smallest inner diameter of the outer form, and is expanded within the outer form to, or essentially to, the original outer diameter thereof. The raw belt member may be subjected to a pressure gradient, drop or differential effective from the outside toward the inside for retracting, pulling-in or drawing-in the diameter thereof. The raw belt member has strength carriers of synthetic polymers which shrink in the heat, and may be subjected to an elevated temperature for retracting, pulling-in or drawing-in the diameter thereof.

1 Claim, No Drawings

METHOD OF PRODUCING ENDLESS DRIVE BELTS

The present invention relates to a method of producing endless drive belts of natural or synthetic rubber with thread-like embedded strength carriers which preferably extend in the longitudinal direction. The invention relates especially to multiple V-belts and similar belts having continuous longitudinal ribs over the inner periphery thereof. A raw belt is built up in reverse layer sequence and is placed into an external or outer form, in which it is formed-out and vulcanized. The belts are then turned or rolled over into the condition of utilization thereof.

In contrast, for example, to toothed belts which, because of the transversely directed tooth arrangement, even in longer rolls, are relatively easy to pull off in the axial direction from the inner form core used for finish vulcanization, and which therefore also to begin with can be built up in the condition of use with the layer sequence progressing from the inside to the outside, multiple V-belts, grooved belts, and the like, embodied with longitudinally extending ribbing, offer or bring about a problem of deformation or opening the mold without diameter expansion and damaging tears or pulling as a consequence thereof. It has become customary to counter these difficulties by building up the raw belt configuration in an upside-down or reverse position, which means building up in a layer sequence progressing from the outside to the inside, and to subsequently roll over or turn the finish vulcanized belts (suitably after first cutting the belts to their intended width), representing a procedure designated in practice as "carding" or "burring". The forming-out or formation of the longitudinal ribs, and the vulcanizing, must be undertaken in this case in an external form or mold. The finished belts can be removed from such an external form or mold without special difficulties. Problematic, however, in contrast, is the introduction of the prepared raw belts, since these are produced either undersized and must be expanded or widened to a larger diameter inside the form or mold, or, on the other hand, in order to avoid disadvantageous folding of the rolls of the raw belt with the danger of bending damage and uncontrollable lengthening of the strength carriers, there is required a form or mold composed of two or more parts in a segmented manner of assembly thereof. Irrespective of the complicated form or mold constructions, both the forced diameter changes, and also the unavoidable flash or excess rubber formed on the impact grooves or recesses of the outer form or mold, affect the rotating or revolving accuracy of the finished belts. Such out-of-round conditions give rise to costly post-working or subsequent handling.

The present invention, in view of the foregoing, has the object to economically produce drive belts with special upper surface structures having ribs or blocks, particularly multiple V-belts having high revolving accuracy.

This object, and other objects and advantages of the present invention, are resolved by proceeding with the method of the initially described type in such a way that the raw belt, produced oversize with respect to the external form, is retracted or drawn-in to an outer diameter corresponding to the smallest inner diameter of the outer form, and is expanded within the outer form to, or essentially to, its original outer diameter.

The present invention makes possible application of undivided outer forms, and accordingly assures a basic precondition for the production of high quality belts without any upper surface markings which result from dividing grooves, and which would cause post-working to be undertaken or which would affect the quiet operation of the belts in use. The otherwise prescribed limits appearing herefrom to begin with are overcome surprisingly with the novel method or manner of proceeding, whereby the strength carriers are already built-in into the raw belt configuration with the provided final diameter, and, as a result of the forming and vulcanizing procedure within the outer form, are brought back again to this final and simultaneously original diameter. The original thread or cord position always correctly results or sets itself consequently in the finished belt, so that the belts finally taken from the form always result in repeated sequence uniformly with an accuracy previously not attainable. Conversely, the waste, scrap or rejected material, portion is practically entirely abolished or terminated for reasons of method efficiency, and occurs now only as a result of operating errors.

The embodiment of the inventive concept of the special method applied for pulling or drawing in the raw belts conforms in its essential steps according to the origin and characteristics of the strength carriers. For the strength carriers of synthetic polymers, as for example polyamides or polyesters, preferably utilized in high quality belts, the present invention utilizes the possibilities provided with the known heat shrinkage of these synthetic materials in that according to an important portion or participating feature, the raw belt members are subjected to an elevated temperature for pulling-in, drawing-in or retracting the diameter thereof. The procedural sequence is then approximately as follows, clarified with a sample embodiment scheme:

Building up the raw belt member in upside-down position upon a winding drum (winding diameter = finishing diameter);

removing the raw belt member from the drum and introducing it into a heat cabinet or enclosure (shrinking);

inserting the raw belt member in heated condition into the outer form;

embedding a pressure or heating sleeve or collar into the raw belt member, expanding and forming-out the same (finish diameter = winding diameter);

vulcanizing, subsequently cooling (fixation of the belt length);

opening the mold or form (removing the belt from the mold or form);

cutting off the individual belts from the winding or roller in upside-down position, and subsequently carding or burring the individual belts.

Belts with strength carriers, for instance of natural polymers or other materials which do not shrink in heat, can be protectively pulled or drawn into a smaller raw belt diameter in that such strength carriers are subject to a pressure gradient, drop or differential effective from the outside toward the inside according to another portion or partial feature of the present invention, as is known in another connection in the course of building up of pneumatic tires.

The present invention is, of course, in no way restricted to the specific disclosure of the specification, but also encompasses any modifications within the scope of the appended claims.

What I claim is:

1. A method of producing a plurality of endless rubber drive belts configured as V-belts or groove belts wherein each belt has continuous longitudinal ribs extending only around the inner periphery thereof and longitudinally extending reinforcing strands of synthetic polymers extending therein, said method employing a winding drum for initially building up a raw belt structure and an external mold for curing the built-up raw belt structure, said external mold having a large inner diameter substantially equal to the finished belt diameter and a smaller inner diameter, said method comprising the steps of:

constructing a raw belt structure, which is subsequently separated into the plurality of belts, said raw belt structure having an outer diameter greater than the small inner diameter of the external mold, said raw belt structure being constructed by building up the raw belt structure on the drum in reverse layer sequence from the outside toward the inside;

removing the raw belt structure from the drum;

heating the raw belt structure to reduce the diameter of the raw belt structure by shrinking the raw belt structure and the reinforcing strands therein until the outer diameter of the raw belt structure substantially corresponds to the smaller inner diameter of the external mold;

placing the raw belt structure in the external mold;

expanding the raw belt structure within the external mold to an outside diameter corresponding to the large inner diameter which is essentially the original outer diameter of the raw belt structure;

vulcaning the raw belt structure within the external mold to produce a vulcanized belt structure;

cooling the vulcanized belt structure to fix the belt dimensions;

stripping the vulcanized belt structure from the mold;

dividing the vulcanized belt structure into a plurality of separate belts, and turning the belts right-side-in from the inside-out configuration for subsequent use.

* * * * *

UNITED STATES PATENT AND TRADEMARK OFFICE
CERTIFICATE OF CORRECTION

PATENT NO. : 4,315,788
DATED : 16 February 1982
INVENTOR(S) : Hans Henell

It is certified that error appears in the above—identified patent and that said Letters Patent is hereby corrected as shown below:

On the title page, please correct the (30) Foreign Application Priority Data as follows:

(30)        Foreign Application Priority Data

Dec. 22,1978 (DE) Fed. Rep. of Germany...2855622

Signed and Sealed this

*Twentieth* Day of *April 1982*

[SEAL]

*Attest:*

GERALD J. MOSSINGHOFF

*Attesting Officer*      *Commissioner of Patents and Trademarks*